April 12, 1949.     J. C. MARIS     2,467,267
EQUALIZING SYSTEM
Filed Oct. 16, 1945     2 Sheets-Sheet 1
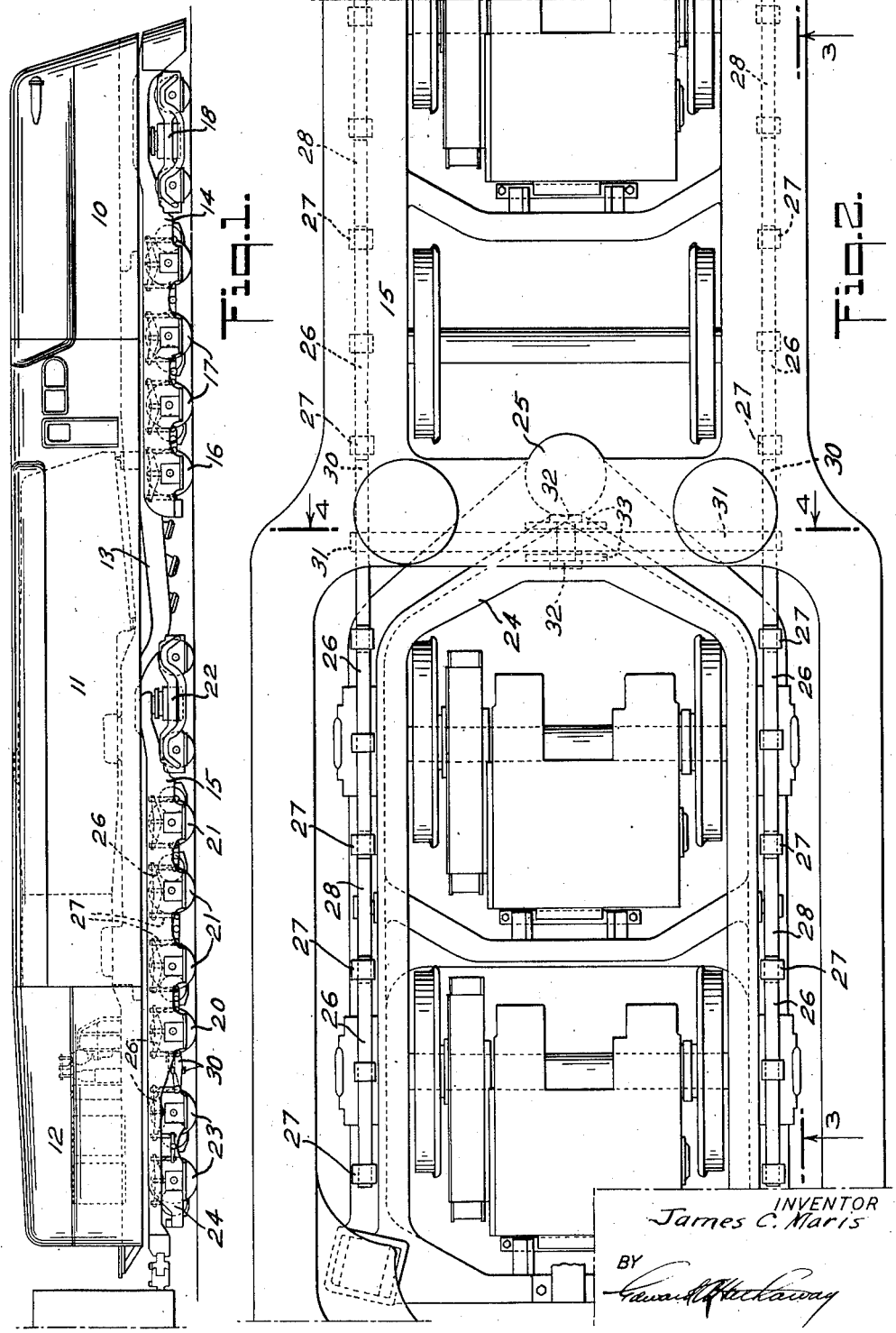
INVENTOR
James C. Maris
BY
ATTORNEY April 12, 1949.   J. C. MARIS   2,467,267
EQUALIZING SYSTEM
Filed Oct. 16, 1945   2 Sheets—Sheet 2
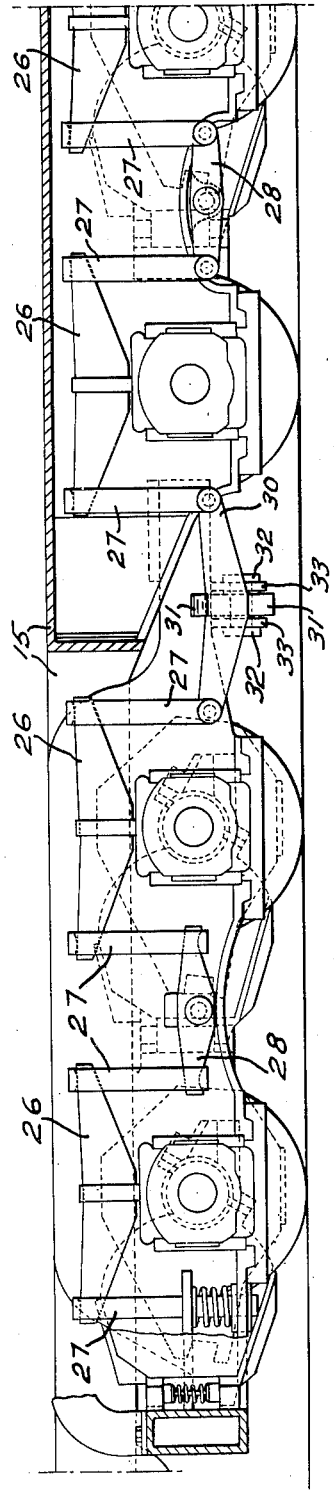
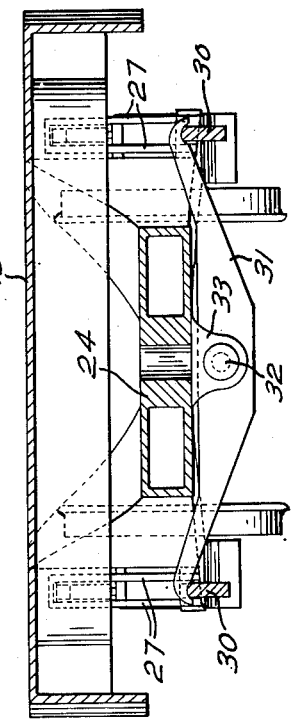
INVENTOR
James C. Maris
BY
ATTORNEY Patented Apr. 12, 1949

2,467,267

UNITED STATES PATENT OFFICE 2,467,267

EQUALIZING SYSTEM

James C. Maris, Glenolden, Pa., assignor to The Baldwin Locomotive Works, a corporation of Pennsylvania Application October 16, 1945, Serial No. 622,514

6 Claims. (Cl. 105—82)

The present invention relates to locomotives, and more particularly to a novel equalizer system for interconnected trucks.

Some of the objects of the present invention are: to provide an improved equalizer system for locomotives; to provide an equalizer system wherein an accurate distribution of the load upon the trucks of a locomotive is made possible; to provide a plurality of equalizer systems for the respective trucks of a locomotive wherein each system is interconnected for straight line action; to provide an equalizer system for each side of a pair of articulated trucks in conjunction with means for transferring the action of one side system to the other; to provide two side equalizer systems for each of two articulated trucks which are linearly interconnected respectively and in addition include lateral load responsive means for transferring the action of one interconnected side system to the other; and to provide other improvements as will hereinafter appear.

In the accompanying drawings, Fig. 1 represents a side elevation of an elongated locomotive embodying one form of the present invention; Fig. 2 represents an enlarged detail in plan of a trailer truck coupled to a leading truck and showing one form of the invention; Fig. 3 represents a side elevation partly broken away of the parts shown in Fig. 2; and Fig. 4 represents a section on line 4—4 of Fig. 2.

Referring to the drawings, one form of the present invention is shown as applied to a locomotive of the elongated cab type formed by a fuel bunker unit 10, a steam boiler unit 11, and an electric generator unit 12. The aforesaid units are mounted upon an underframe 13 which in turn is carried, in this instance, by a front truck frame 14 and a rear truck frame 15. The frame 14 serves to journal the respective axles of a pair of idler wheels 16 and three pairs of power driven wheels 17, while the forward end of the frame 14 is supported in articulated relation by a four wheeled guiding truck 18. The frame 15 serves to journal the respective axles of a pair of idler wheels 20 and three pairs of power driven wheels 21, while the forward end of the frame 15 is supported in articulated relation by a guiding truck 22. Below the generator unit 12 is a trailer or delta truck having two pairs of wheels 23 which are, in this instance, power driven and journalled in a frame 24 having its forward end connected by an articulated joint 25 with the rear truck frame 15.

For the purpose of equalizing the distribution of the load under all conditions, each truck is provided with pairs of leaf springs 26, links 27, and pivoted equalizer bars 28, which are arranged in aligned relation at opposite sides of the respective trucks. Thus, the equalizer system upon the trailer or delta truck has a straight line relation to the link equalizer system on the rear power truck. These two equalizer systems are arranged for interconnection between the two trucks, which interconnection includes a novel lateral or cross equalizing system whereby the action of two aligned side systems, not only forms a unitary equalizer system for each side of both trucks but also serves to distribute strains and stresses in one side system to that of the other and thereby nullify, heretofore, unequalized action. This novel interconnecting means consists, as here shown, of a lever 30 at each side of the forward end of the trailer truck, and having its ends respectively pivoted to the rear link 27 of the power truck equalizer system and to the front link 27 of the trailer truck system. The two levers 30 seat the hook-shaped ends of a cross beam 31 which extends transversely of the front end of the trailer truck below the frame 24 and is supported on a pivot 32 carried by a bracket 33 depending from the frame 24. It will thus be apparent that a complete equalizing system has been devised wherein two end coupled trucks are provided with two side linearly arranged interconnected systems functioning to minimize stresses and strains due to rocking of the trucks, while in addition a separate transversely disposed equalizer system conjointly functions to more effectively relieve and distribute the load variations caused by track irregularities, track curves, and other distortion incident to rail travel.

It will of course be understood that various changes in details of construction and arrangement of parts may be made by those skilled in the art without departing from the spirit of the invention as set forth in the appended claims.

Having thus explained the invention, I claim:

1. In a locomotive, the combination of a main truck, a trailer truck, an equalizer system extending longitudinally along each side of each truck, longitudinal equalizer levers interconnecting the respective longitudinal systems, and transverse equalizing means pivoted to one of said trucks and connected to said levers for interconnecting said side systems.

2. In a locomotive, the combination of a main truck, a delta trailer truck pivotally connected to said main truck substantially on its longitudinal centerline, an equalizer system extending longitudinally along each side of each truck, each system on each truck being substantially in longitudinal alignment with one corresponding system on the other truck, longitudinal equalizing levers interconnecting the respective aligned side systems, and equalizing means pivoted to one of said trucks and extending transversely between said trucks for connection to said levers for transferring the action of one side equalizer system to the other.

3. In a locomotive, the combination of a leading truck, a trailer truck, an articulated connection between said trucks, an equalizer system extending longitudinally along each side of each truck, equalizer levers connecting the equalizer systems respectively of one truck with the equalizer systems of the other truck, and transverse equalizer means between said trucks and interconnecting said levers, said means being pivoted to one of said trucks.

4. In a locomotive, the combination of a leading power driven truck, a trailer truck, an articulated connection between said trucks, an equalizer system extending along each side of each truck, equalizer levers connecting the equalizer systems respectively of one truck with the equalizer systems of the other truck, and a transverse beam pivoted beneath one truck having ends respectively bearing on said levers, whereby the action of one side equalizer system is transferred to the opposite side equalizer system.

5. In a locomotive, the combination of a leading power driven truck, a trailer truck, an articulated connection between said trucks, an equalizer system extending along each side of each truck, equalizer levers connecting the equalizer systems respectively of one truck with the equalizer systems of the other truck and a transverse beam pivoted below the forward end of the trailer truck having ends respectively bearing on said levers, whereby the action of one side equalizer system is transferred to the opposite side equalizer system.

6. In a locomotive, the combination of a leading power driven truck, a trailer truck, an articulated connection between said trucks, an equalizer system extending along each side of each truck, each system on each truck being linearly aligned with the corresponding system on the other truck, equalizer levers connecting the equalizer systems respectively of one truck with the equalizer systems of the other truck, and a transverse beam pivoted below the forward end of the trailer truck having ends respectively bearing on said levers, whereby the action of one side equalizer system is transferred to the opposite side equalizer system.

JAMES C. MARIS.

REFERENCES CITED

The following references are of record in the file of this patent:

UNITED STATES PATENTS

| Number | Name | Date |
|---|---|---|
| 1,413,399 | Gee | Apr. 18, 1922 |
| 1,679,147 | Ashworth | July 31, 1928 |